(No Model.)

A. W. TUBBS.
THERMOSTAT.

No. 308,293. Patented Nov. 18, 1884.

WITNESSES
Wm A. Skinkle
Jas. S. Latimer

INVENTOR
Albert W. Tubbs,
By his Attorneys
Pope Edgecomb & Butler

UNITED STATES PATENT OFFICE.

ALBERT W. TUBBS, OF JERSEY CITY, NEW JERSEY.

THERMOSTAT.

SPECIFICATION forming part of Letters Patent No. 308,293, dated November 18, 1884.

Application filed February 20, 1884. (No model.)

*To all whom it may concern:*

Be it known that I, ALBERT W. TUBBS, a citizen of the United States, residing in Jersey City, in the county of Hudson and State of New Jersey, have invented certain new and useful Improvements in Thermostats, of which the following is a specification.

My invention relates to the class of apparatus employed for automatically completing the connections of an electric circuit when the temperature at the place where the instrument is located has risen to a predetermined degree.

The object of my invention is to provide an instrument which will uniformly respond when subject to a given amount of heat, which will not become useless or uncertain in its operations by long and continued use, which is simple in its construction, and especially adapted to the requirements of fire-alarm systems and other similar purposes.

The invention consists in constructing an instrument in substantially the following manner: A stout metallic inclosing-case is provided with a thin yielding corrugated diaphragm soldered tightly at its edges to the inner surface of the case, thus forming a chamber which is designed to contain a small quantity of volatile fluid. The top of the inclosing-case is provided with a suitable opening, through which the fluid may be supplied after the diaphragm is soldered in position, and a cap-screw is fitted tightly within this opening when the fluid has been placed therein. Upon the outer surface of the diaphragm there is carried a circuit-closing point, which is normally separated from a corresponding circuit-closing or contact point carried upon an adjusting-screw. The adjusting-screw passes through an insulated support carried upon a suitable base, to which the inclosing-case is fastened. The inclosing-case is preferably pinned tightly to a solid metal base, which in turn is fastened to the non-conducting support of the instrument. Suitable binding-posts, which are respectively connected with the adjusting-screw and with the diaphragm and its circuit-closing point, are provided for placing the instrument within an electric circuit.

The instrument is designed to be employed for completing an electric circuit through an alarm or other signaling instrument for the purpose of giving warning when the temperature to which it is exposed reaches a certain point; or it may be employed in connection with any other kind of work to which this class of instruments is usually applied.

Figure 1:
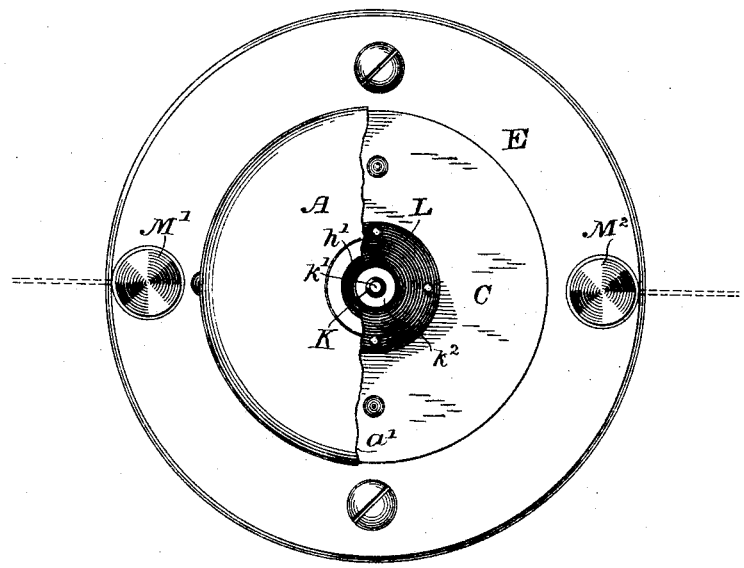
Figure 2:
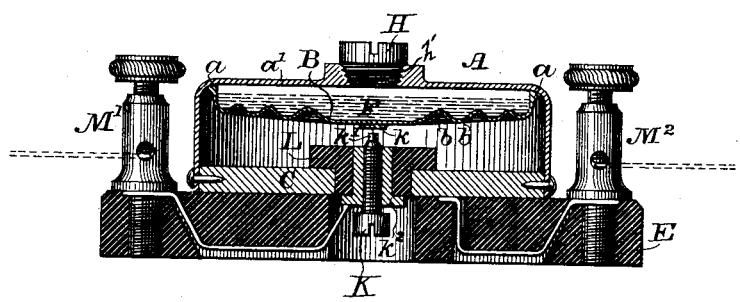

In the accompanying drawings, Figure 1 is a plan view, partly in section, of an instrument embodying the invention, and Fig. 2 is a vertical transverse section of the same.

Referring to the drawings, A represents a suitable spun-metal case for inclosing and supporting a diaphragm, B. The case A is pinned to a suitable solid metallic base, C, which in turn is supported upon a non-conducting support, E. Within the interior of the inclosing-case A is placed the diaphragm B, which is preferably provided with annular corrugations, as shown at $b\,b$. This diaphragm is soldered at its edges to the inner surface of the inclosing-case A, as shown at $a\,a$. A space, F, is thus left between the diaphragm and the upper surface or top, $a'$, of the case A. This space is designed to be more or less filled with a quantity of volatile fluid—such, for instance, as alcohol, turpentine, naphtha, or any other fluid adapted to be expanded sufficiently or to vaporize under the influence of heat.

For the purpose of rendering the chamber F air-tight and inclosing the fluid therein, it is necessary to solder the diaphragm in position before inserting the fluid, which might otherwise be unduly expanded or ignited by reason of the heat required for soldering, and to afterward tightly close the opening which must necessarily be left for inserting the fluid. This is accomplished by forming in the top A a screw-aperture, $h'$, into which a screw, H, is designed to fit tightly. The aperture $h'$ is preferably in the form of the frustum of a cone, converging toward its lower extremity, as shown in the drawings. By forming the aperture and the screw H, which conforms thereto, in this manner, I am enabled to secure a more perfect joint.

The quantity of fluid which is necessary to place in the chamber F may be varied somewhat; but in practice I prefer a quantity sufficient to occupy about one-third of the space. It is evident that when the chamber A has thus been slightly filled with a few drops of volatile fluid—such, for instance, as alcohol—and then subjected to heat, the expansion resulting therefrom will cause the flexible diaphragm B to be thrown outward, and the degree to which it will be thus pressed outward will depend upon the amount of heat to which it is subjected.

Upon the outside of the diaphragm, at or near its center, there is placed a contact-point, preferably of platinum, as shown at $k$. This point is designed to be moved, when the instrument is subjected to sufficient heat, against a corresponding circuit-closing or contact point, $k'$, carried upon a suitable screw or other support, K. The screw K passes through a suitable nut, $k^2$, which in turn fits tightly within a non-conducting washer, L, resting upon the solid metallic base C, and the position of the point $k'$ with reference to the point $k$ may be adjusted by turning the screw K a greater or less distance within the nut.

Two binding-posts, $M^2$ and M′, are mounted upon the base E, and they are respectively connected with the case A through its base C, and thus with the point $k$ and with the adjusting-screw K and circuit-closing point $k'$. The parts are so adjusted that normally a small separation will exist between the two contact-points $k$ and $k'$. When, however, the instrument is subjected to a predetermined amount of heat, the point $k$ will be thrust against the point $k'$, and an electric connection will be completed from the binding-post M′ to the binding-post $M^2$ through these points.

In practice I have found it desirable to subject the instrument two or three times to a temperature somewhat greater than that at which it is desired that it shall, when in use, complete the circuit-connections before finally adjusting the position of the contact-point $k'$, for in this manner the volatile fluid becomes to a certain extent gaseous and the subsequent operations of the instrument will be entirely uniform.

I claim as my invention—

1. The combination, substantially as hereinbefore set forth, of the supporting-case A, the corrugated diaphragm B, soldered thereto at its edge and forming therewith an air-tight chamber, a volatile fluid permanently inclosed in said chamber, the contact-point $k$, carried upon said diaphragm outside the air-tight chamber, the metallic base C, the insulated contact-point $k'$, extending within the case A, and against which the first-named contact-point is designed to impinge when the volatile fluid is subjected to a predetermined amount of heat, and the non-conducting base E, upon which the metallic base C is carried.

2. The combination, substantially as hereinbefore set forth, of an inclosing-case, a diaphragm forming with said inclosing-case a permanently-closed air-tight space or chamber, a volatile fluid inclosed within said chamber, a conical screw fitting into a conical opening formed in said case, for admitting said fluid into said chamber, a circuit-closing point carried upon said diaphragm outside the air-tight chamber, and a contact-point applied to said circuit-closing point.

3. The combination, substantially as hereinbefore set forth, of the case, the corrugated diaphragm, together forming a permanently-closed chamber, a volatile fluid contained therein, the contact-point carried upon the outside of said diaphragm at or near its center, the adjustable screw, the nut for receiving said screw, and the non-conducting washer in which said nut is inserted.

4. The combination, substantially as hereinbefore set forth, with the case and the diaphragm, together forming the permanently-closed air-tight chamber, of the volatile fluid contained therein, a contact-point carried upon the outside of the diaphragm at or near its center, and a second contact-point, against which the first-named contact-point is designed to impinge.

In testimony whereof I have hereunto subscribed my name this 18th day of February, A. D. 1884.

ALBERT W. TUBBS.

Witnesses:
 W. H. LITTEL,
 HENRY N. BAUER.